(12) United States Patent
Delatorre

(10) Patent No.: US 6,329,648 B1
(45) Date of Patent: Dec. 11, 2001

(54) PHASE LOCKED LOOP FIBER OPTIC SENSOR SYSTEM

(76) Inventor: Leroy C. Delatorre, 130 Industrial Blvd., Sugar Land, TX (US) 77478

(*) Notice: Subject to any disclaimer, the term of this patent is extended or adjusted under 35 U.S.C. 154(b) by 0 days.

(21) Appl. No.: 09/443,131

(22) Filed: Nov. 18, 1999

Related U.S. Application Data

(60) Provisional application No. 60/109,137, filed on Nov. 19, 1998, provisional application No. 60/118,137, filed on Feb. 1, 1999, and provisional application No. 60/124,736, filed on Mar. 17, 1999.

(51) Int. Cl.$^7$ .................................................. G01N 21/25
(52) U.S. Cl. ............................... 250/227.23; 250/227.12
(58) Field of Search .......................... 250/227.12, 227.23, 250/227.11, 227.18, 227.14, 559.29, 559.38; 356/498, 73, 373, 482, 493

(56) References Cited

U.S. PATENT DOCUMENTS 6,246,482 * 6/2001 Kinrot et al. ....................... 356/499

* cited by examiner

Primary Examiner—Que T. Le

(57) ABSTRACT

A fiber optical system for sensing a physical displacement of a light reflecting surface, where the system includes at a first location, a sensor unit including light reflecting surfaces arranged and constructed for physical displacement as a function of a parameter to be measured; at least two fiber optic sensor elements located relative to the reflective surfaces where the spacing between the surfaces and each of the end of said optic sensor elements is used to determine a function of displacement of the surfaces in response to a measurement parameter; and an optical fiber delay line coupled to the fiber optic elements for delaying travel time of light relative to the respective fiber optic elements; and at a second location, a voltage controlled oscillator connected to at least one light source where a parameter of a light source is controlled by the voltage controlled oscillator; first and second photo detectors respectively for sensing light from a light source and from the reflective surfaces, and fiber optic line element means for coupling a light source at the second location to the delay line means at the first location for communication of light between a light source and the reflective surfaces and for communication of light to one of said photo detectors and further for coupling light reflected from said reflective surfaces to the other photo detector; and a phase comparator responsive to the first and second photo detectors for controlling the voltage controlled oscillator; and a recording device for detecting the displacement of the reflective surfaces as a function of the control of said voltage controlled oscillator.

15 Claims, 7 Drawing Sheets

PHASE LOCKED LOOP FIBER OPTIC SENSOR SYSTEM

PRIOR APPLICATIONS

This application claims the benefit of the following U.S. Provisional applications: No. 60/109,137 filed Nov. 19, 1998; No 60/118,137 filed Feb. 1, 1999; and No. 60/124,736 filed Nov. 17, 1999.

FIELD OF THE INVENTION

This invention relates to fiber optic sensor systems and more particularly to an optical fiber communication system where a relatively long wave length of light can be used in the detection of a small physical displacement, for example, for measurements of a parameter which effects a small full scale displacement therefore requiring resolution of micro-displacements for accurate measurement.

BACKGROUND OF THE INVENTION

Fiber optic sensor systems generally rely on varying the intensity of a light beam or upon measurements based on the wavelength of light. The first approach is analog in nature and, therefore, limited for high performance applications. The second approach is capable of greater performance but still has limitations.

An example of the limitations of the second approach is based upon light interference. The wavelength of a typical coherent light source is 0.83 micrometers or 33 micro-inches. An optical resonant cavity designed for this wavelength will display interference maximums and minimums at one half wavelength intervals, or 16.5 micro-inches. If strictly digital performance is desired, then, these interferences must be counted to measure a displacement. A high performance sensor, however, can easily require one part in one million resolution so that the required displacement for this type of measurement would be 16.5 microinches×one million=16.5 inches. Since this is generally not practical for parameters such as high pressure, a compromise must be msde. For example, a displacement of 50 interferences would be 0.0008 inches, which would give a resolution of 2%, based on digital techniques. Any additional required resolution for this maximum displacement would then have to be obtained from analog interpolation of phase information to further resolve the displacement between interferences.

Other disadvantages of these wavelength of light approaches are the requirement for single mode fibers and potentially sophisticated, expensive readout interface equipment. Single mode fibers are required to preserve the coherency of the light source in the optical system. These fibers have to have an extremely small diameter core (on the order of 0.0004 inches) and therefore are difficult to splice, connect and handle. The disadvantages of complex, expensive readout equipment speak for themselves.

SUMMARY OF THE INVENTION

This invention is intended to address the difficulties of high resolution by being based on a relatively low frequency light modulation (such as 5 or 10 Mhz) instead of the wavelength of light. This circumvents the need for single mode fibers and coherent light sources, but does not preclude their use. It is also an object of this invention to provide the ability to function with small sensor displacements using this long wavelength modulation as well as directly provide a high resolution digital output.

In a first embodiment of the present invention, a light source is located at one location and a sensor is located at a remote second location.

The concept is to transmit light, modulated at a relatively low frequency, from the light source to the sensor along a fiber optic line element arrangement which can be thousands of feet in length. A phase reference signal and a phase signal from the sensor are then returned back to operate a phase comparator at the location of the light source and to control the modulation frequency of the transmitted light as a function of the input displacement parameter of the sensor. The input displacement developed within the sensor is derived from an input parameter, such as pressure or temperature. The arrangement further nulls out the effects of the length of the optic fiber line element arrangement and permits measurements of micro-inch displacements of the input displacement parameter of the sensor.

In the first embodiment, light is transmitted along a first optic fiber line element to a sensor unit. At the sensor unit, a second optic fiber line element is utilized to return the transmitted light to a first photo detector located at the light source location. The light is applied to the sensor unit and reflected light from the sensor unit returns to a second photo detector at the light source.

The sensor unit includes an optical delay line which creates a phase shift of the light passing through it. When the measurement parameter changes, the distance to the reflector surface changes with respect to the optic fiber ends and this reflected light to the optic fiber ends produces a phase change of the light wave which is sensed at the second photo detector located with the light source. This change is very small for this configuration but this arrangement is shown for illustration. The method of obtaining large changes will be covered below.

The two photo detectors output to a phase comparator which senses the phase shift and drives a voltage controlled oscillator to adjust the frequency modulating the light source. This frequency is adjusted until a 180 degree phase difference exists between the inputs of the phase comparator. This frequency, then, will be determined by the combined path length of the sensor delay line and reflector, If all other delays were to cancel or be calibrated out Measuring the frequency can be used to determines the parameter measurement.

In a modification of the first embodiment, the sensor unit can obtain a reference reflector and at the other location, a reference light source. A frequency select switch is utilized to switch the measurement reflection and the reference selection between the two optic fiber line element. At the sensor unit, a second optic fiber line element is used to return the phase reference light to a first photo-detector located at the light source location. The transmitted light is also applied at the sensor unit to an optical delay line module and then to a reflector. Reflected light passes again through the optical delay line and returns to a second photo-detector at the light source location.

In a modification of the first embodiment, the sensing unit can contain a reference reflector and, at the other location, a second light source. A frequency select switch is utilized to switch the measurement and reference reflections between the two optic fiber line elements. Adding the two resultant frequencies will null out the effect of the line length.

In a second embodiment, a single optical fiber line element is utilized together with a WDM communication protocol. By using two different optical frequencies, the single optical fiber line element can process both a reference phase signal and a measurement phase signal from a sensor unit with fewer components than the first embodiment.

This invention is particularly useful in oilfield completions where the length of the line element can reach 15,000 feet or more.

DESCRIPTION OF THE INVENTION

Figure 1:
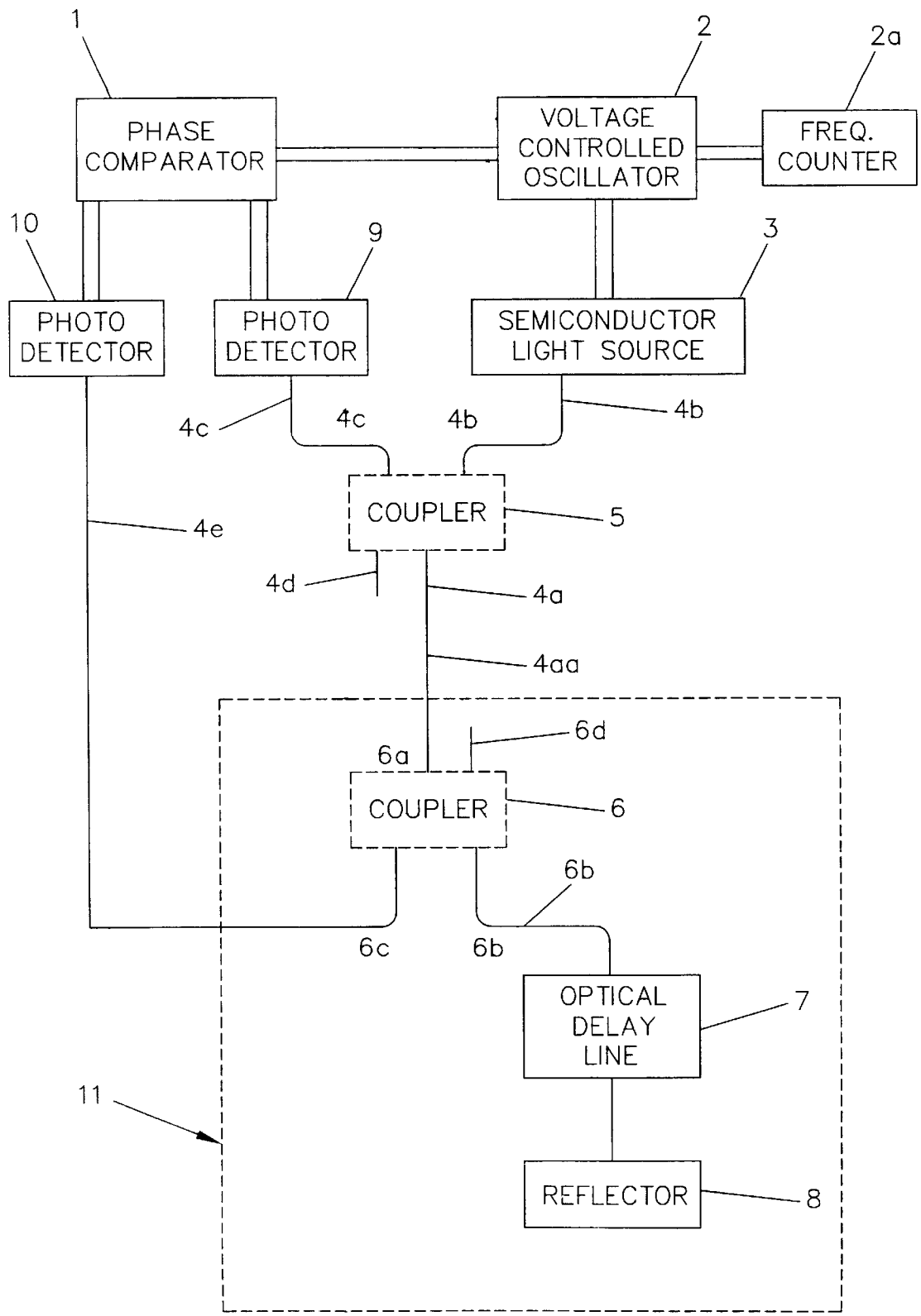
FIG. 1 is a schematic illustration of a first embodiment of an optic fiber system embodying the present invention.

The principle of one embodiment of the present invention is shown in FIG. 1. As shown in FIG. 1, a conventional phase locked loop is illustrated and includes a phase comparator 1 which drives a voltage controlled oscillator 2. The oscillator 2 drives a semiconductor light source 3. The light source is preferably a super luminous or light emitting diode which produces an output of incoherent light. The intensity output of the light source 3 is proportional to the drive current from the oscillator and therefore the amplitude of the light output is modulated by the oscillator 2. The light output of the light source 3 is coupled to optical fiber element 4b which in turn couples the light output to an optical coupler or optical coupler 5. Coupler 5 is a bidirectional optical coupler connected to optical fibers 4a–4c shown in single line. Input 4d is not utilized. Other connections shown in FIG. 1 are electrical conductors shown in double lines. The fiber optic coupler 5 is common in the industry and transmits light bidirectionally.

The coupler or splitter 5 shown in FIG. 1 couples light from the light source into coupler outputs, 4a and 4d. The light input is then transmitted via the fiber optic line 4aa to a remote additional splitter or coupler 6.

This light at coupler 6 is then split between outputs, 6b and 6c. The light output to optical fiber line element 4e is conveyed back to a photodetector 10 and serves as a phase reference for the light entering the delay module 7 from the coupler 6. Thus, the light present at outputs 6b and 6c of the coupler 6 have a modulation that is exactly in phase because both outputs are derived from the same input 6a.

Continuing with respect to FIG. 1, the light output by coupler 6 into the fiber 4d is passed through an optical delay line 7 and then to a reflector 8. The light returned from the reflector 8 then passes through the delay line again and into the coupler 6 and the output b in the reverse direction. This is then coupled by the coupler 6 to its input 6a and then on to a photodetector 9 via fiber elements 4aa and 4c. Any reflected light has no effect on the semiconductor light source 3 as commercially available devices can be used to prevent this. It is, however, detected by photodetector 9 and compared against the light returning to photodetector 10 by the phase comparator 1. The phase comparator 1 then sets the voltage controlled oscillator 2 to a frequency that makes the phase difference go to 180 degrees.

It can be appreciated that the length of the light path from the semiconductor light source 3 back to each photodetector 9 and 10 will affect the phase of the reflected light from the reflector 8 with respect to the light source 3. Since the common source of light for both paths originates at the input of optical coupler 6, then it is the path difference from this point that actually determines the phase difference.

The path length from output 6c, of coupler 6 is simply the length of optical fiber 4e. The phase difference between the photodetector inputs would be zero if the path length of fiber 4e were made equal to the combined path length of 4aa and 4c because the propagation time delays would be equal. These phase differences due to these time delays would effectively cancel then if they were equal. The path length from output 6b of the coupler 6 however, also permits light to travel through the optical delay, 7, twice before returning back through optical fiber 4aa.

The reason for the reference path back through fiber element 4e is simply to negate the effects of phase shifts due to line lengths necessary to connect a remote sensor to the instrumentation electronics. It is desirable to remove the electronics from the sensor for measurement applications involving such factors as high heat exposure, electrical interference, high voltage hazard and/or explosion hazard.

A drawback to the basic system of FIG. 1 is that the return optical paths must be exactly equal for their effect to cancel. This could be a severe constraint for high performance systems. At 10 Mhz, for example, one half wavelength is approximately 35 feet and a return difference of this magnitude would result in a relative phase shift of 180 degrees. If the phase modulation were 90 degrees for a full scale indication, and if it is also desired to maintain an accuracy of 0.01%, then the return length match would have to be held to a tolerance of 0.02 inches.

Figure 2:
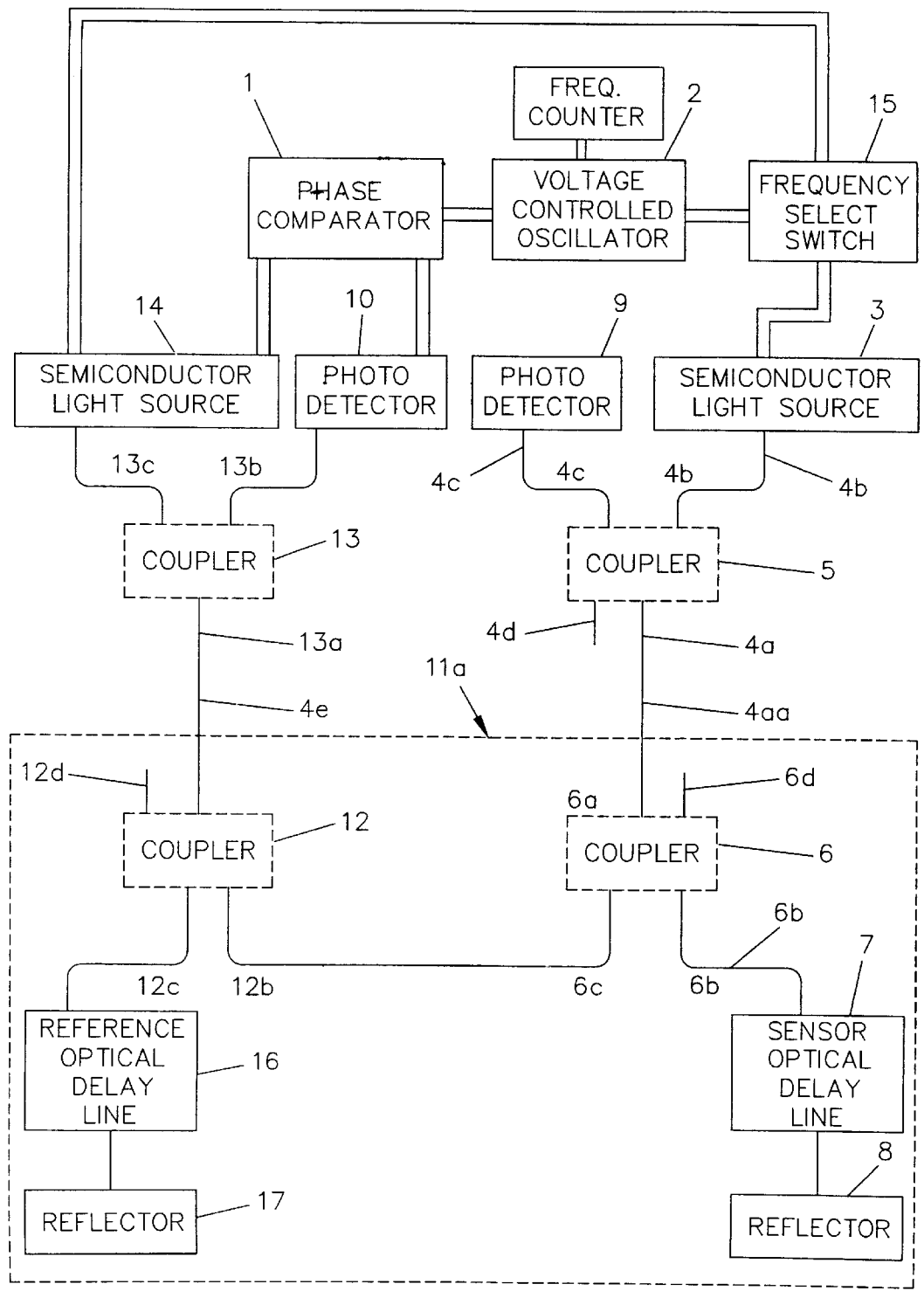
FIG. 2 is a schematic illustration of a modification of the embodiment shown in FIG. 1.

This problem of possible unequal return paths is addressed by the system outlined in FIG. 2. This system is the same as the system of FIG. 1 except for the addition of a reference delay line and the ability to sequentially make two measurements over the same connecting optical fibers.

Referring to FIG. 2, all designators and their functions remain the same as in FIG. 1. The difference is simply the addition of components to provide the additional measurement capabilities.

The additions over FIG. 1 include a second semiconductor light source 14, a frequency select switch 15, two more optical couplers 12 and 13, a reference optical delay 16, and a reference reflector 17. It is also apparent that the optical components of FIG. 1 have been duplicated around fiber 4e to result in a totally symmetrical dual optical system.

The function of the frequency select switch 15 is simply to allow the selection of either of the semiconductor light sources 14 or 3 to act as the light output for the voltage controlled oscillator 2. When one is selected, the other is inactive.

When the semiconductor light source 3 is selected, operation is exactly the same as described for FIG. 1. The return path for the reference phase still is by means of fiber 4e but now includes two additional couplers 12 and 13. Light entering terminal 12b of the coupler 12 is essentially directed to terminal 13a with very little coupling to terminal 12c. In the coupler 13, however, the light entering the terminal 13a is evenly split between terminals 13c and 13b as was described for coupler 5. Since the phase comparator 1 sets the oscillator frequency for the condition of equal phase at its inputs then the frequency set by the phase comparator 1 will be determined by:

$$T1/2 = D1 - D2 + Ds$$

where:

T(1)=period of the voltage controlled oscillator frequency.

D1 =delay due to the optical path length from coupler 6, terminal 6b, back to photodetector 9.

D2 =delay due to the optical path length from coupler 6, terminal 6c, back to photodetector 10.

Ds=delay due to the optical path length of the sensor delay line 7.

The period is equal to twice the total effective delay because this is the point where the phase shift due to the delay is 180 degrees out from the reference. There is also another 180 degree phase shift due to the reflection of the light signal at the end of the delay line. This phase shift, however, is constant with frequency.

Alternately, when semiconductor light source 14 is activated then the frequency set by the phase comparator will be determined by:

$$T(2)/2 = D2 - D1 + Dr$$

where:

Dr=delay due to the optical path length of reference delay line 16 and the "2" subscripts for T denote the second frequency measurement. The signs of D1 and D2 become reversed because the inputs for the phase comparator must be switched for this measurement.

Adding the two periods to each other yields:

$$(T(1)+T(2))/2 = (D1-D2+Ds)+(D2-D1+Dr)$$

$$= Ds+Dr$$

which is independent of the optical path lengths except for the sensor and reference delay lines.

The propagation wavelength of a 10 Mhz light signal in an optical fiber is approximately 70 feet long. If the optical delay of optical delay line 7 is made equal to one quarter of this length, then a phase inversion will occur for the light which is reflected back through it into output 6b of the coupler 6. If all other path length delays are cancelled out, as described above, then the frequency of the voltage controlled oscillator will be determined by the combined delay of the optical of delay line 7 and the reflector path length. If this optical delay is controlled by the effect of a measure and on a sensor then the oscillator frequency CD supplied to a frequency counter will indicate the magnitude of that measure and. It is apparent, however, that a microinch change in the length of a 35 foot effective delay line is going to have a negligible effect on the total delay and corresponding frequency.

Figure 3:
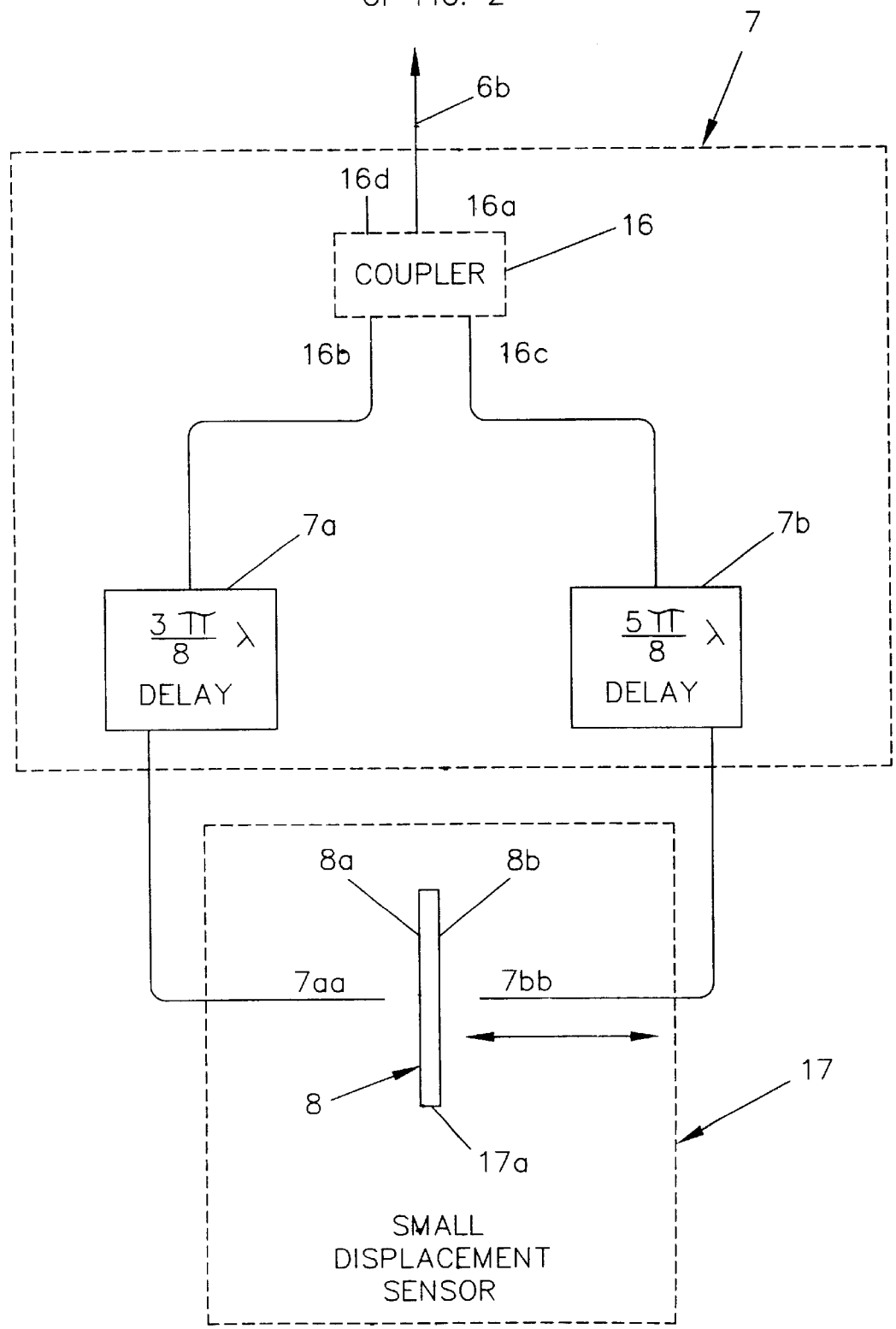
FIG. 3 is a vector diagram of a sensor response when the phase relationship is 180 degrees out of phase.

A method of controlling the effective delay of the sensor delay line from a small displacement is shown in FIG. 3. The fiber element 4d is the same designator as in FIG. 2 and is shown in FIG. 3. An additional coupler 16 has been added as well as two delay lines 7a and 7b. These three components together are shown as delay line unit 7. Also, a small displacement sensor is shown as 17 in FIG. 3 and serves to illustrate a type of reflector 8.

The displacement sensor 17, for this example, consists of a diaphragm 17a mirrored on both sides, 8a and 8b. The optical fibers, 7aa and 7bb, are positioned close to their respective silvered surfaces, 8a and 8b, so that any light emanating from each is partially reflected back into itself. The amount of light returned into each fiber is a function of the distance between the fiber end and the reflecting surface. The position of the diaphragm 17, then, determines the ratio of amplitudes of reflected light returned back through the two fibers 7aa and 7bb. This reflected light now passes back through each respective delay for a second time so that the total delay experienced by each is twice its delay line value.

The delay lines, 7a and 7b, are simply made by winding a predetermined length of optical fiber on a mandrel. The length of each is a function of the desired center frequency of the oscillator. Thus, if lambda is the wavelength of the desired center frequency for light travelling in the optical fiber element used, then a length equal to one half of the wavelength would equal Pi radians and the length of each delay line would be determined by the ratios of Pi shown.

Figure 4:
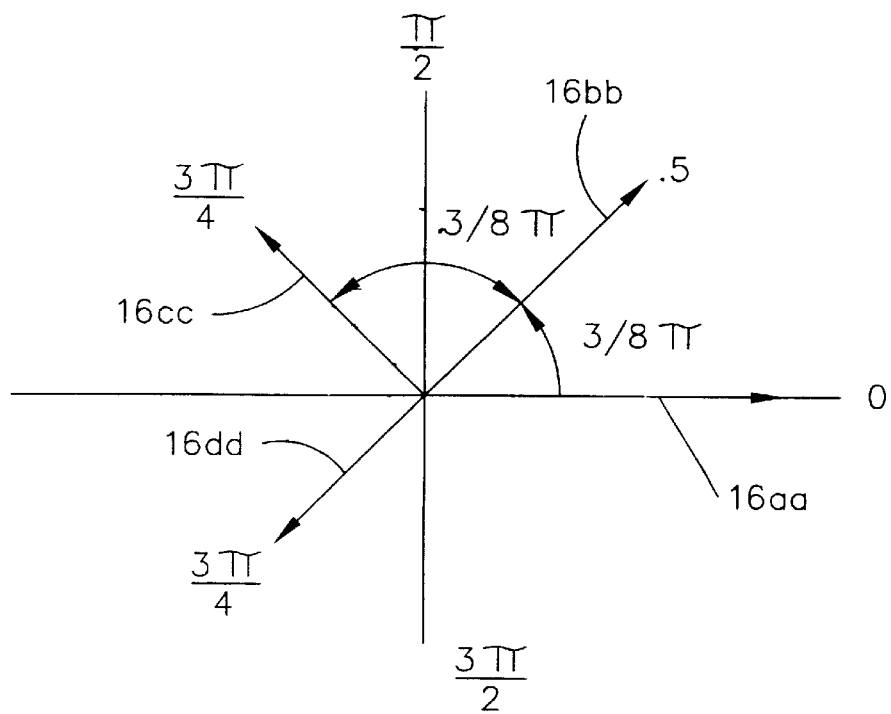
FIG. 4 is a vector diagram of the effect of the delay lines in the sensor unit.

FIG. 4 shows a vector 16aa, at zero radians which enters the input 16a, of the optical coupler 16 of FIG. 3. It is split into two equal 0.5 amplitude vectors by the optical coupler 16. One half of the vector from terminal 16b of optical coupler 16 is rotated to 0.375 Pi by being passed through the first delay line 7a. This is shown as vector 16bb in FIG. 4. It is reflected by surface 8a of FIG. 3 and then rotated another 0.375 Pi to position 16cc, as shown in FIG. 4. Its amplitude is now less than 0.5 because of the incomplete return from the reflecting surface 8a. Similarly, the other half of the light exiting from coupler output 16c is rotated to 1.25 Pi, as shown by vector 16dd by two passes through the second delay line 7b. The values chosen for the delays are selected for optimum sensitivity to a small displacement with respect to the fiber diameter but other values could be used, as will become evident.

Figure 5:
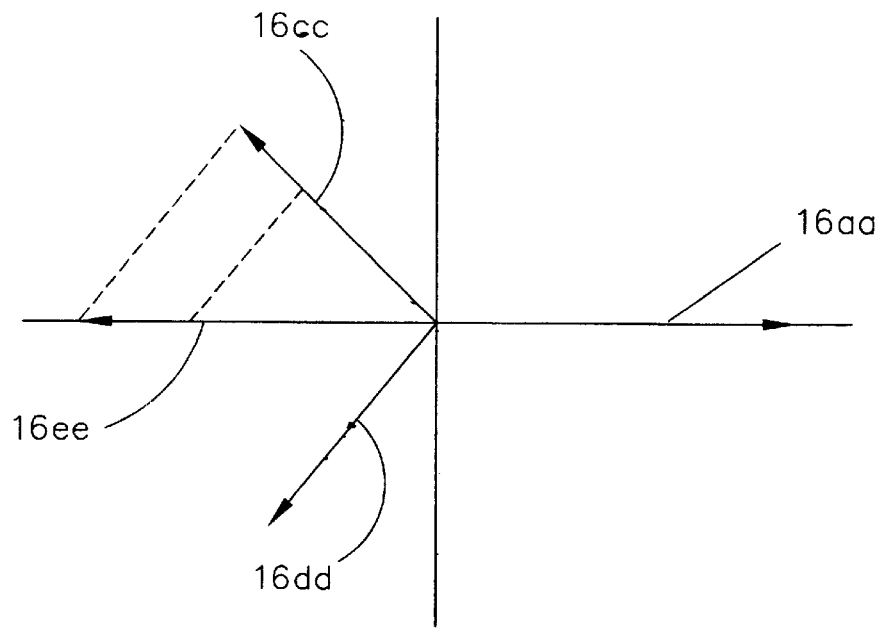
FIG. 5 is a schematic illustration of a sensor unit and a delay means.

If the voltage controlled oscillator output is sinusoidal and the light signals are not coherent then FIG. 5 shows how the two equal delayed vectors 16cc and 16dd can be summed to yield a resultant vector 16ee. This resultant vector is 1.414 times the amplitude of either component vector, 16cc and 16dd, and 180 degrees out of phase with the driving source vector 16aa. This summation of the vectors 16cc and 16dd occurs when the reflected light is returned from fibers 7aa and 7bb (FIG. 3) back to inputs 16b and 16c of the coupler 16 (FIG. 3). This summation occurs because both coupler inputs 16b and 16c are now used to transmit light backwards to output port 16a, and then equally into fiber element 4d. This is the return light signal which is ultimately coupled to the photo detector 9 of FIG. 2.

Figure 6:
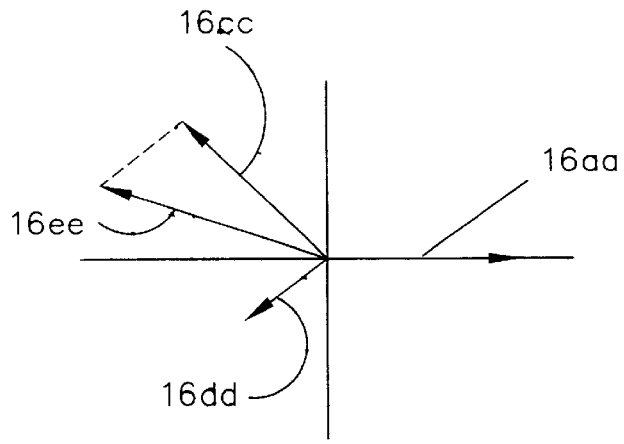
FIG. 6 is a vector illustration which occurs when the reflector means is displaced.

FIG. 6 shows the effect of an off center displacement of the diaphragm 8 of FIG. 3. The displacement in reflector unit 17 this example is to reduce the spacing relative to fiber 7aa and to increase the spacing of the reflector surface relative to fiber 7bb. This unequal spacing will increase the reflected light returned into fiber 7aa and decrease the reflected light in fiber 7bb. This in turn, increases the amplitude of vector 16cc and reduces vector 16dd as shown in FIG. 6. The vectors 16cc and 16dd have the same phase relationship as before but their amplitude ratio is now changed. This ratio change displaces the resultant vector 16ee from the original 180 degree position, as shown. This new phase position is sensed by the phase comparator 1, (FIG. 2) and it changes the voltage controlled oscillator frequency to return the vector 16ee to its original 180 degree position. This is accomplished by raising the frequency which will rotate all vectors (except the source vector 16aa) until the vector 16ee aligns with the 180 degree out of phase position. This counterclockwise rotation occurs because the higher frequency has a shorter wavelength, lambda, and the fixed delays are now a greater proportion of the reduced wavelength.

It can also be appreciated that the required displacement of a diaphragm 8 to effect a detectable change can be extremely small in view of the diameter of the light fibers, 7aa–7bb. Typical high performance multimode fiber core diameters are approximately 0.002 inches in diameter while single mode fibers will be on the order of 0.0004 inches. It should also be appreciated that the displacements to achieve large frequency changes can be only a fraction of the fiber diameter since one full diameter of displacement can reduce the light amplitude returned back into a fiber by a factor of roughly two.

Figure 7:
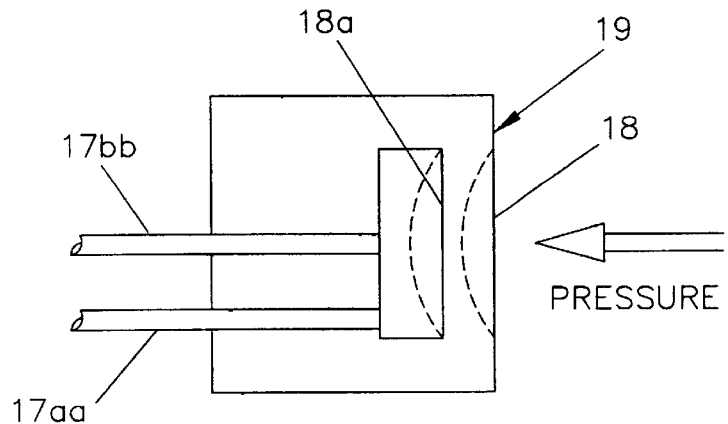
FIG. 7 is a schematic illustration of a sensor variation.
Figure 8:
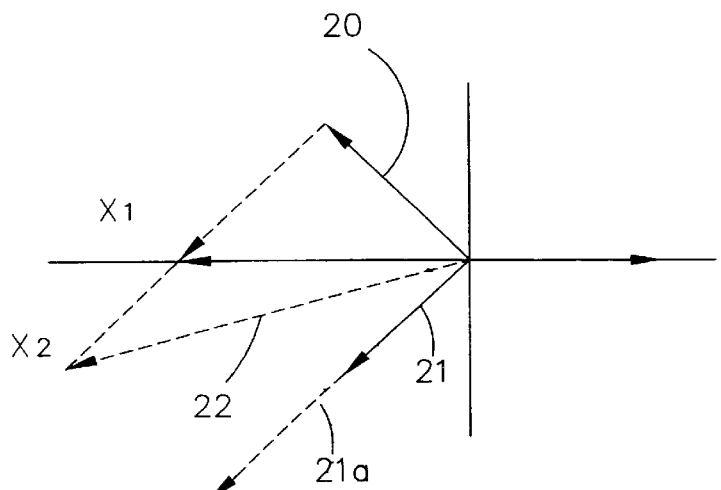
FIG. 8 is a vector illustration caused by displacement of the sensor shown in FIG. 7.

FIG. 7 is an illustration of how a small displacement sensor can be configured with both fibers on same side. In this example, a diaphragm 18 is configured as part of a pressure sensing capsule 19. The back side 18a is coated with a reflective coating and the spacing from the coating to fiber ends 17aa and 17bb is equal. This produces equal amplitude vectors 21 and 22 as shown in FIG. 8.

When pressure is applied, however, it has a large effect on the reduction of the spacing for fiber 7bb but practically no effect on the end spacing of fiber 7aa. The effect of this ratio change is shown in FIG. 8 by the increased size 21a of vector 21 which results in a phase change of the resultant vector 22. It can be also be appreciated that all vectors due to a two to one change in amplitude of vector 21 will lie along the path described from X2 to X1.

A wavelength multiplexer approach can also be used for bring back reference light from the sensor optical coupler in addition to reflector light from a measure and effect on a reflector. This approach uses components developed for the telecommunications industry and is known as Wavelength Division Multiplexing (WDM). It is based on using two different wavelengths of light to provide two independent channels on a single light fiber and has the advantage of eliminating the return optical fiber 4e and reference delay 16 of FIG. 2. This technique also provides the added advantage of assured matching of the reference and sensing transmission path lengths (since they now are the same fiber) as well as eliminating the need for a dual frequency output.

Figure 10:
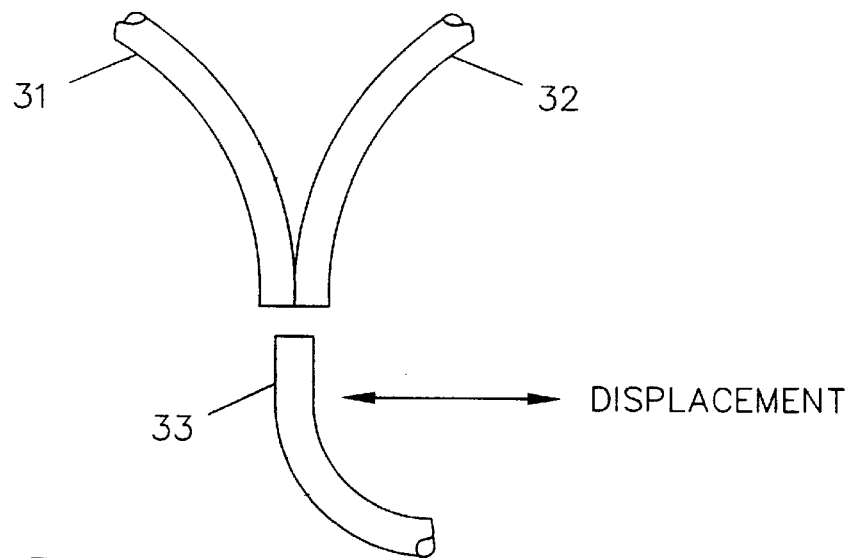
FIG. 10 is an illustration of another form of an optical sensor.

FIG. 10 shows a technique for sensing small displacements without using reflection. This configuration consists of three fibers. Fibers 31 and 32 both have the same function of either sending or receiving light. Fiber 33 will have the opposite function of fibers 31 and 32.

If fiber 33 is the source of light and is positioned midway between fibers 31 and 32 then fibers 31 and 32 will each receive the same amount of light. Small displacements toward one or the other will increase the light to one while decreasing that of the other. Since the core on a multimode fiber is about 0.002 inches in diameter, then all three fibers must be in close proximity of each other and accurately aligned. Very small displacements, however, can produce significant ratio changes.

Figure 11:
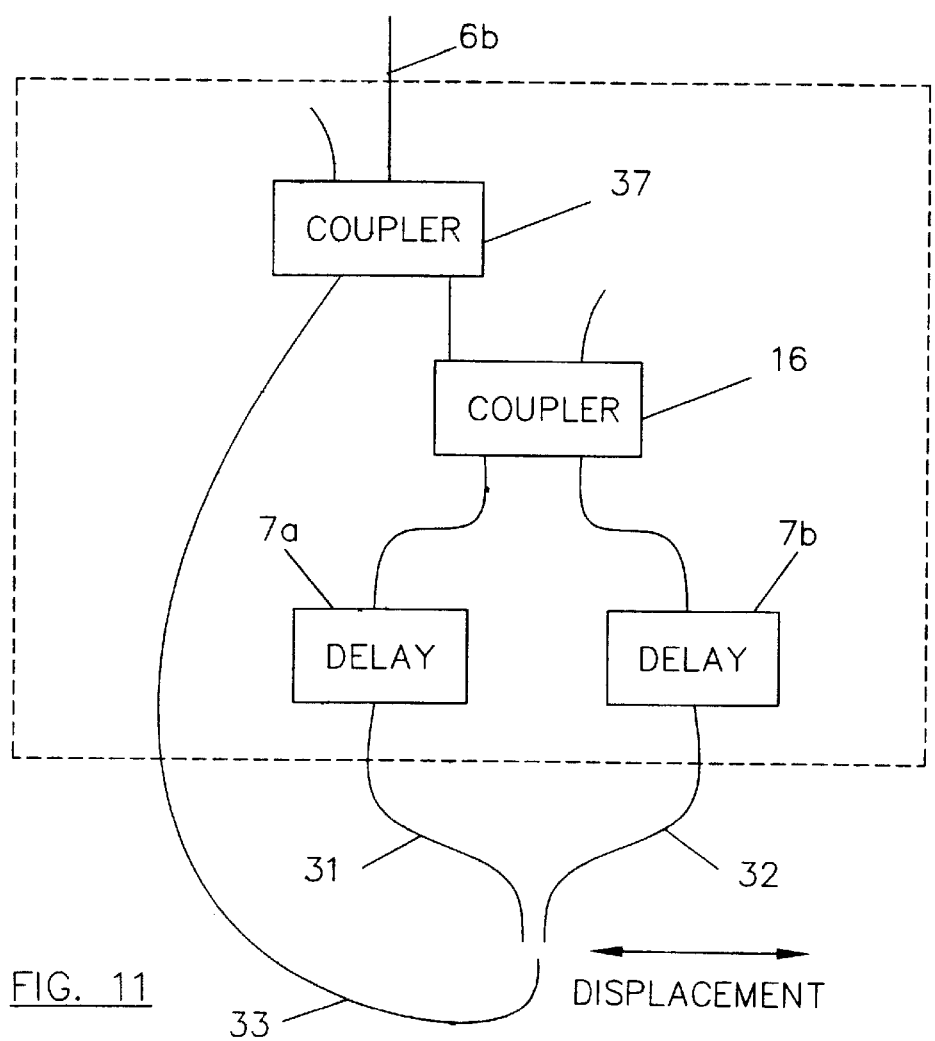
FIG. 11 is an illustration of the sensor of FIG. 10 in an operating system.

FIG. 11 shows that an additional coupler 37 is required to use the sensor of FIG. 10. All other components and functions in 7 of FIG. 10 have the same function as the corresponding components shown in FIG. 3.

It should be noted that either of the fiber lines to sensor 17, in FIG. 3 or 12, can be terminated into a reflector. This allows the other line to be used in a single ended sensor configuration that only varies one light signal.

Figure 9:
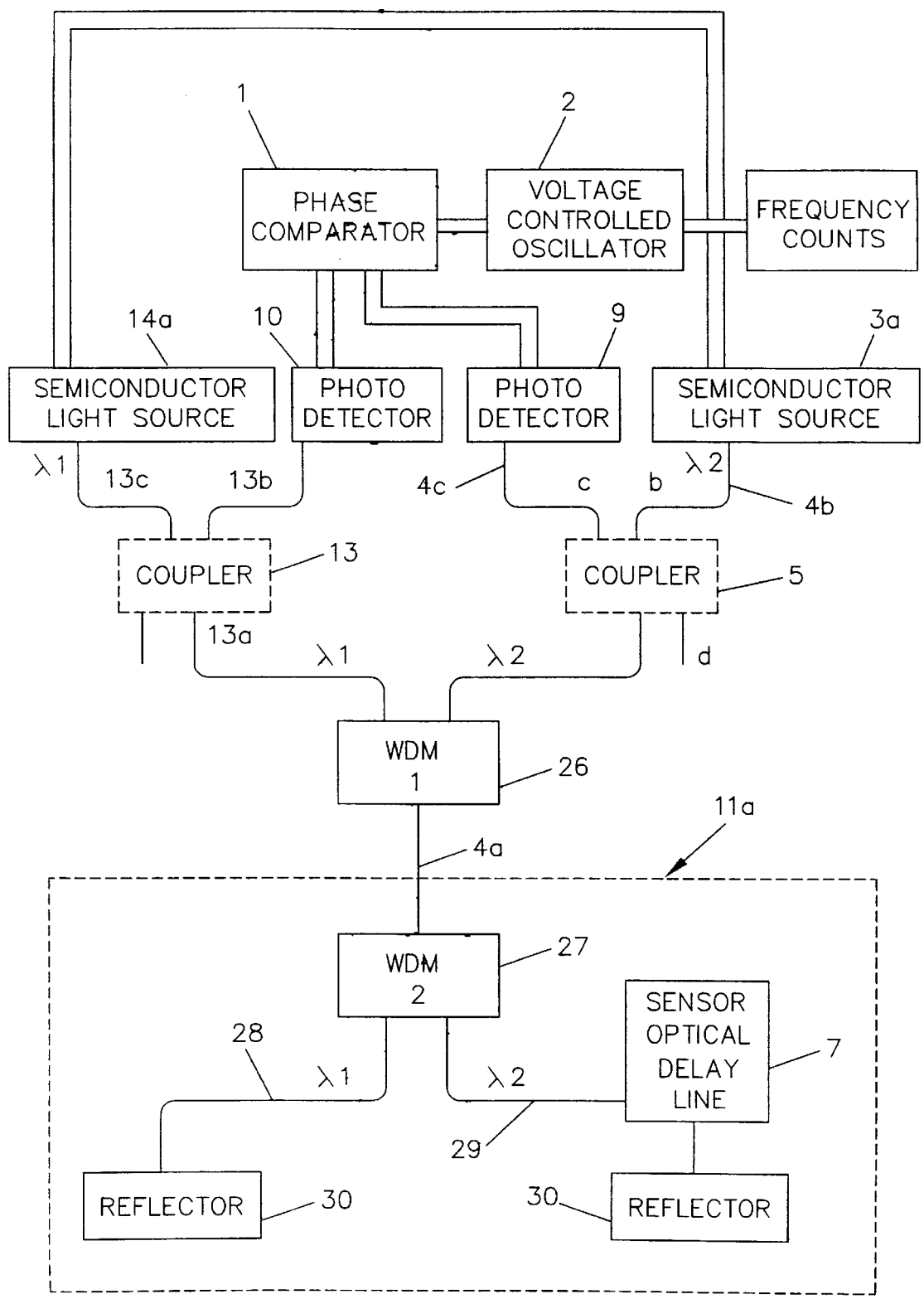
FIG. 9 is a schematic illustration of another embodiment of the present invention.

The adaptation to WDM is illustrated by referring to FIGS. 2 and 9. Inspection will show that FIG. 9 is simply a modification of FIG. 2 with the addition of WDM1 and WDM2 (26 and 27 in FIG. 9). Deleted from FIG. 2 are couplers 6 and 12 as well as fiber 4e and the delay 16. Also, the two semiconductor light sources 14a and 3a have been changed to operate at two separate light wavelengths (colors). The two separate wavelengths lambda 1 and lambda 2 and are driven in parallel so the frequency select switch 15 of FIG. 2 is not necessary. Lambda 1 is labeled as the output of light source 14a and lambda 2 is the output of light source 3a in FIG. 9.

In operation, the two different wavelength light outputs are simultaneously combined by WDM1 (26) and transmitted onto fiber 4a in FIG. 9. For example, wave length can be 1550 nanometers and 1310 nanometers. Fiber 4a is the connecting fiber to the remote sensor assembly 11a and terminates in WDM2 (27). WDM2 (27) serves to separate the two light wavelengths onto respective output fibers 28 and 29. Lambda 1 appears on fiber 28 and is reflected back by reflector 30. It returns back through WDM2 (27) to WDM1 (26) which routes it back to photodetector 10, through the coupler 13. Similarly, lambda 2 appears on fiber 29 and is delayed by delay line 7 before it is reflected back on its original path to photodetector 9.

It is apparent that the path lengths of lambda 1 and lambda 2 can be made the same except for sensor optical delay 7. It is also apparent that changing the length of the remote connecting optical fiber 4a will affect the path lengths for both lambda 1 and lambda 2 equally and therefore have no effect on the difference between the path lengths. This difference is what phase comparator 1 uses to set the frequency of the voltage controlled oscillator 2 because one light channel serves as the reference for the other. Since the difference can be made to cancel all delays except for that due to the sensor optical delay 7, then the frequency of the voltage controlled oscillator 2 will be determined by the optical delay 7. This is independent of the connecting fiber 4a and is the desired result.

Referring to FIG. 3, it should be noted that the separate return paths of lambda 1 and lambda 2 on exiting WDM1 (20) will not be corrected for by cancellation. Thus, if there is a change in the fiber length path from WDM1 (20) to the photodetector 10 input, for example, then there will be a corresponding uncorrected change in the output frequency of the voltage controlled oscillator. The same also holds true for the separate lambda 1 and lambda 2 paths, 28 and 29, in the sensor module 11. These paths, however, are fixed within the sensor module and their effect is calibrated with the sensor.

The WDM technique, then, introduces the requirement for fixing the separate lambda 1 and lambda 2 path lengths within the non-remote portion of FIG. 9 and an additional calibration correction for any effect they introduce. The approach of FIG. 2, however, corrects for all path length changes outside of the remote sensor section 11 and therefore does not require any additional corrections or control of external path lengths. The same would also hold true for any input electronic delays within the phase comparator 1 as these would have the same effect as a path length change.

It will be apparent to those skilled in the art that various changes may be made in the invention without departing from the spirit and scope thereof and therefore the invention is not limited by that which is disclosed in the drawings and specifications but only as indicated in the appended claims.

What is claimed is:

1. A fiber optical system for sensing a small physical displacement of a light reflecting element in response to a measurement parameter to be measured, said system including:

at a first location,
- a control unit having light means for generating light having a relatively long wavelength as compared to the wavelength of light;
- phase sensing means for detecting a phase change between reflected light and reference light from a second location, and
- an oscillator connected to said light means where the frequency of the light means is controlled by the said oscillator and the oscillator is controlled by said phase sensing means;

at the second location,
- a sensor unit having a parameter displacement means for receiving light from said light means and for generating reflected light, said parameter displacement means having small physical displacements in response to a measurement parameter, and
- light delay means coupled to said parameter displacement means for producing a large change in phase between reflected light in response to said parameter displacement means and reference light, and
- reference light means for providing reference light at said second location where said reference light is derived from said generated light at said second location, and
- optic fiber line means for coupling said control unit to said sensor unit so that a physical displacement in the parameter displacement means can be determined at the first location from the control of the light means.

2. The apparatus as set forth in claim 1 where said optic fiber line means includes WDM means at said first and second locations for communicating light at different frequencies and said control unit has at least two light sources providing light at different frequencies.

3. The apparatus as set forth in claim 2 where said optic fiber line means further includes separate optical coupler means for coupling one of said light sources and a photocell in said phase sensing means and for coupling the other of said light sources and another photocell in said phase sensing means to said WDM means at said first location.

4. The apparatus as set forth in claim 1 wherein said parameter displacement means includes a diaphragm with opposite surfaces having reflective coatings.

5. The apparatus as set forth in claim 1 wherein said parameter displacement means includes two parallel optical fiber ends in side by side relationship and has a facing optical fiber end which is displaceable relative to the other two ends to develop a ratio of light delivered to said two ends.

6. The apparatus as set forth in claim 5 and further including an optical coupler coupled to said facing optical fiber end and to a second coupler, said second coupler being coupled to said two optical fiber ends by said delay means.

7. The apparatus as set forth in claim 1 wherein said optic fiber line means includes first and second optical fiber elements respectively coupled to fiber element couplers, and wherein said sensor unit has a reference optical delay line and optical reflector, and wherein the optical couplers at the sensor unit are coupled to one another, Said control unit further including a second light means where said second light means and a photocell detector are coupled to a first optic fiber element and, the other light means and another photocell detector is coupled to said second optical fiber elements, and a frequency selector switch is connected to the two light sources and operated by the oscillator to switch the light source application to a fiber line element.

8. A fiber optical system for sensing a physical displacement of a light reflecting surface, said system including:

at a first location,
- a sensor unit including light reflecting surface means arranged and constructed for physical displacement as a function of a parameter to be measured;
- at least two fiber optic elements located relative to said reflective surface means where the spacing between the surface means and each of the end of said optic elements is used to determine a function of displacement of the surface means in response to a measurement parameter;
- an optical delay line means coupled to said fiber optic elements for delaying travel time of light relative to the respective fiber optic elements;

at a second location,
- a voltage controlled oscillator connected to a light source where a parameter of the light source is controlled by the said voltage controlled oscillator;
- first and second photo detectors respectively for sensing light from said light source and from said refelective surface means;
- fiber optic line element means for coupling said light source at said second location to said delay line means at said first location for communication of light between said light source and said reflective surface means and for communication of light to one of said photo detectors and further for coupling light reflected from said reflective surface means to said other photo detector;
- phase comparator means responsive to said first and second photo detectors for controlling said voltage controlled oscillator;
- and means for detecting the displacement of said reflective surface means as a function of the control of said voltage controlled oscillator.

9. The system as set forth in claim 8 where said fiber optic line element means includes
- a first optical fiber line element coupled at one end to one of said photo detectors and coupled to said light source and coupled at its other end to said sensor unit for receiving reflected light from said sensor unit at said one photo detector;
- a second optical fiber line element coupled at one end to the other of said photo detectors and coupled to said sensor unit for transmitting light from said light source to said sensor unit and thence to said other photo detector for minimizing effect due to length of the line elements.

10. The system as set forth in claim 9 where said fiber optic line element means further includes
- at said sensor unit, an optical fiber delay line means for developing a 180 degree shift of the frequency of the light at a null position of the light reflecting surface means.

11. The system as set forth in claim 8 where said fiber optic line element means further includes
- at said light reflecting surface means, a diaphragm with opposite surfaces having a reflective coating and the fiber optical sensor elements coupling said delay line means to respective optical fiber ends located at spaced distances from the diaphragm at a null position of the diaphragm.

12. The system as set forth in claim 8 where said fiber optic line element means includes
at least two optical fiber line elements respectively coupled at one end to said first and second photo detectors and respectively coupled to first and second light sources having the same frequency of light and also, respectively coupled at their other ends to said sensor unit,
in said senor unit, said optical delay line means having first and second delay line units respectively coupled to one of said optical fiber delay line elements and also having a reference reflector means where one of said delay units to said one optical fiber line elements and the other delay unit is coupled to said other optical fiber line element, said optical fiber line elements also being coupled to one another in said sensor unit,
the other optical fiber line element being coupled at it's other end to the other of said photo detectors and also coupled to the second light source,
said first and second light sources being coupled to as frequency select switch means for alternately actuating said light sources for alternately sampling the reflective displacement of the reflective surface means on the respective optical fiber line elements.

13. The system as set forth in claim 8 and further including at said second location a second light source, said sensor unit at said first location having a second reflective surface means, said fiber optic line element means having
an optical fiber line element coupled at one end to each of said photo detectors and to each of said light source and coupled at its other end to said sensor unit for receiving reflected light from said sensor unit at said photo detectors,
each of said light source having different frequencies, first and second WDM means at said respective ends of the optical fiber line element, said WDM means at said sensor unit coupling the second reflector unit and said optical delay line means to an end of the optical fiber delay line means and said WDM means at said second location coupling said photo detectors and said light sources to an end of the optical fiber line element thereby permitting use of a single optical fiber line element.

14. A fiber optical system for sensing a physical displacement of a light reflecting surface, said system including:
at a first location,
a sensor unit including first and second light reflecting surface means arranged and constructed for physical displacement as a function of a parameter to be measured;
at least two fiber optic sensor elements located relative to said reflective surface means where the spacing between the surface means and each of the ends of said optic elements is used to determine a function of displacement of the surface means in response to a measurement parameter;
an optical delay line means coupled to one set of said fiber optic elements for delaying travel time of light relative to the respective fiber optic sensor elements;
said delay line means and the other set of fiber optic sensor elements being coupled to a WDM means for transmission of two frequencies of light;
at a second location,
a voltage controlled oscillator connected to first and second light sources where a frequency parameter of the light sources is controlled by said voltage controlled oscillator;
first and second photo detectors respectively for sensing frequency of light respectively from said first and second reflective surface means;
second WDM means for coupling said respective light source at said second location to said first WDM means at said first location for communication of light at different frequencies between said light sources and said sensor means and for communication of light reflected from said reflective surface means to said respective photo detectors;
phase comparator means responsive to said first and second photo detectors for controlling said voltage controlled oscillator;
and means for detecting the displacement of said reflective surface means as a function of the control of said voltage controlled oscillator.

15. A method for sensing a small physical displacement of a light reflecting element in response to a measurement parameter to be measured, said method including:
at a first location,
generating light having a relatively long wavelength as compared to the wavelength of light;
detecting a phase change between reflected light and reference light from a second location, and
controlling the light means by sensing phase change relative to a norm;
at the second location,
receiving light generated at said first location from said light means and generating reflected light in response to small physical displacements at said second location, and
a delaying the received light relative to the reflected light for producing a large change in phase between reflected light in response to physical displacements and reference light generated at said second location where said reference light is derived from light received at said second location, and
coupling said generated light and said reflected light from said second location to the first location for controlling the wavelength of the light generated at the first location control unit by sensing the phase difference.

* * * * *